United States Patent [19]
Svetlik

[11] Patent Number: 5,775,736
[45] Date of Patent: Jul. 7, 1998

[54] PLASTIC PIPE FITTINGS

[75] Inventor: Harvey E. Svetlik, Dallas, Tex.

[73] Assignee: Phillips Petroleum Company, Bartlesville, Okla.

[21] Appl. No.: 604,214

[22] Filed: Feb. 21, 1996

[51] Int. Cl.⁶ ..................................... F16L 27/00
[52] U.S. Cl. .......... 285/21.1; 285/133.5; 285/179; 285/423; 29/890.149; 29/890.148
[58] Field of Search .................. 285/21.1, 21.2, 285/21.3, 381.1, 423, 286, 184, 179; 29/890.149, 890.148

[56] References Cited

U.S. PATENT DOCUMENTS

| | | | |
|---|---|---|---|
| 2,147,431 | 2/1939 | Ewing | 285/179 |
| 2,725,079 | 11/1955 | Streed et al. | 285/179 X |
| 3,222,777 | 12/1965 | Rutta et al. | 285/179 X |
| 3,850,459 | 11/1974 | Blumenkranz et al. | 285/156 |
| 3,977,706 | 8/1976 | Schneider | 285/286 X |
| 3,979,809 | 9/1976 | Schneider | 285/179 X |
| 4,089,455 | 5/1978 | Fellers | 285/184 X |
| 4,457,543 | 7/1984 | Justus | 285/184 X |
| 4,504,086 | 3/1985 | Carrow | 285/156 |
| 4,514,244 | 4/1985 | Shaefer et al. | 285/179 X |
| 4,586,734 | 5/1986 | Grenier | 285/340 |
| 4,653,777 | 3/1987 | Kawatsu | 285/179 X |
| 4,681,349 | 7/1987 | Press et al. | 285/286 X |
| 5,108,135 | 4/1992 | Mercado | 285/156 |
| 5,255,943 | 10/1993 | Keller et al. | 285/21.2 |
| 5,411,300 | 5/1995 | Mitsui | 285/381.1 X |

FOREIGN PATENT DOCUMENTS

| | | | |
|---|---|---|---|
| 2207578 | 6/1974 | France | 285/21 |

Primary Examiner—Dave W. Arola
Attorney, Agent, or Firm—Ryan N. Cross

[57] ABSTRACT

A reinforced plastic pipe fitting is made by using interference fit techniques to apply an outer pipe over a straight section of inner pipe. Appropriate sections of the outer pipe are then cutout. After arranging the fitting to the desired shape, faces of the cutout section are butt-fused together to form a fitting having a reinforcing layer over the shaped inner pipe.

6 Claims, 3 Drawing Sheets

PLASTIC PIPE FITTINGS

BACKGROUND OF THE INVENTION

The present invention relates to reinforced polyethylene plastic fittings suitable for use in piping systems for the transport of fluid under pressure.

Heretofore, plastic pipe fittings, such as tees, elbows and couplings, have been patterned after their metal counterparts in that they have been essentially uniform in wall thickness throughout the body of the fitting. This can create problems where the plastic fitting needs to have a higher pressure rating than the pipeline-main in order to withstand internal pressure. Several methods have been utilized to increase the pressure rating of the plastic fittings. One such method is fabricating the fitting out of heavier pipe having a lower SDR (Standard Dimension Ratio or the ratio of the outer pipe diameter to the wall thickness of the pipe) than the pipeline to which the fitting is to be attached. However, such a method does not provide a fitting with an inside diameter bore equal to that of the pipeline-main, nor does it provide the fitting with ends of the same size and SDR to match the pipeline-main for purposes of connection to the pipeline-main by means of butt-fusion of ends to the pipeline-main.

SUMMARY OF THE INVENTION

It is therefore an object of the present invention to provide for reinforced fittings which have inside diameter bores of diameter equal to that of the pipeline-mains to which they will be attached.

It is a further object of this invention to provide reinforced pipeline fittings which have butt-ends of the same size and SDR to match to the pipeline-main for purposes of butt-fusion of matching ends.

In one aspect of the present invention, there is provided a reinforced pipe fitting comprising an inner tubular member and an outer tubular member wherein said outer tubular member surrounds said inner tubular member in an interference fit.

In another aspect of the present invention, there is provided a process for manufacturing reinforced pipe fittings comprising placing an outer tubular member around an inner tubular member in an interference fit. After the tubular members have been joined by interference fitting, at least the outer tubular member is selectively cut to produce cut pieces and the cut pieces are butt-fused together to form the desired shape of the fitting.

DETAILED DESCRIPTION OF THE INVENTION

The pipe fittings, pipeline-mains and pipes referred to herein are comprised of polyethylene and/or polyethylene copolymers and preferably of high density polyethylene and/or high density polyethylene copolymers.

The reinforced pipe fittings produced according to this invention comprise an inner pipe, or tubular member, and an outer pipe, or tubular member. The outer pipe or tubular member is fitted over the inner pipe in an interference fit such that it surrounds and encases the circumference of the inner pipe. "Interference fit" is used herein to refer to a negative fit, necessitating expansion in one mating part or contraction in the other mating part during assembly. Generally such expansion or contraction can be accomplished by heating or cooling the outer pipe or inner pipe respectively, or such expansion or contraction can be accomplished by applying sufficient force to cause expansion in the outer pipe or contraction in the inner pipe.

The inner pipe will be of the same size and SDR as the pipeline-main with which the fitting is to be mated. Also, it is preferred that the inner pipe will be of greater length than the outer pipe so that upon application of the fitting at least one length of inner pipe will be available which is not surrounded by the outer pipe so that such length is available for mating with the pipeline-main. The outer pipe should have an inner diameter which will allow an interference fit with the outer surface of the inner pipe.

Once the inner pipe and outer pipe are mated in an interference fit, the pipes are cut into pieces from which the pipe fittings can be constructed. The pieces are then butt-fused face to face to form the fitting. By butt-fusing, it is meant that a localized heat is applied to a face of each of two of the pieces in order to melt or soften the polyethylene at the face. Then the heated faces are placed in contact and allowed to cool under sufficient pressure to produce a weld seam along the faces so that the two pieces are joined as one with a zero-leak-rate joint.

Figure 1:
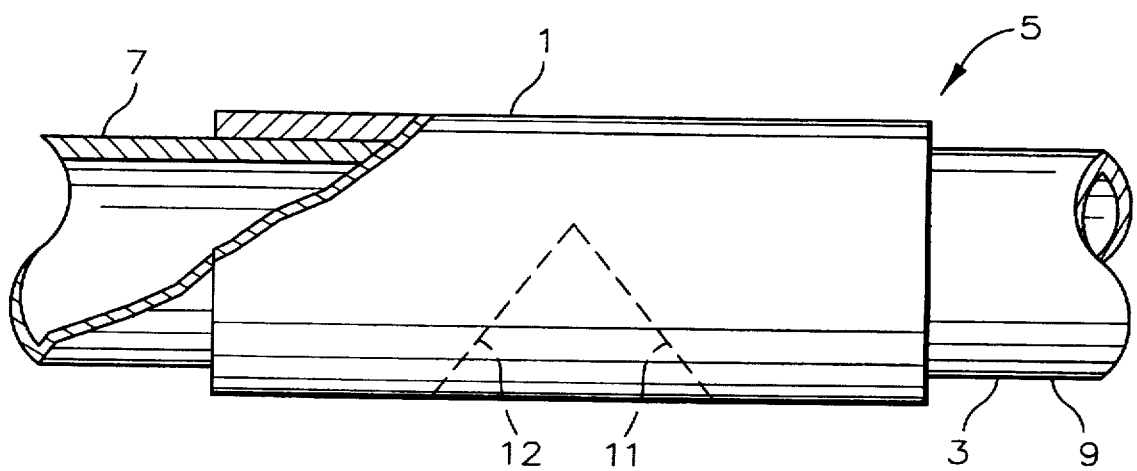
FIG. 1 is a pictorial representation of an interference fit between two pipe lengths with the dotted line illustrating a cut to be made in the resulting dual pipe length.
Figure 2:
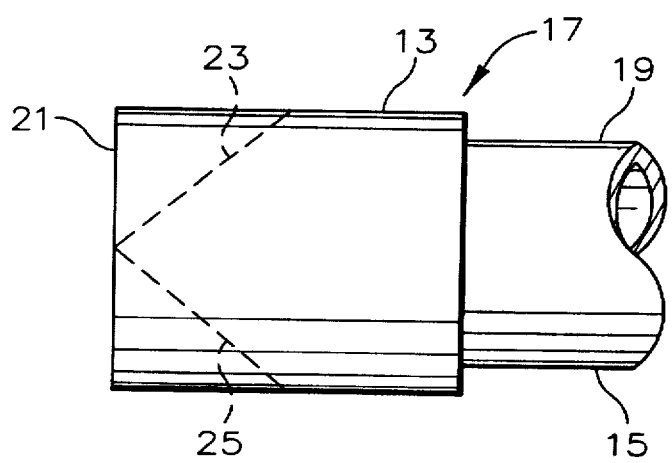
FIG. 2 is a pictorial representation of an interference fit between two pipe lengths with the dotted line illustrating a cut to be made in the resulting dual pipe length.
Figure 3:
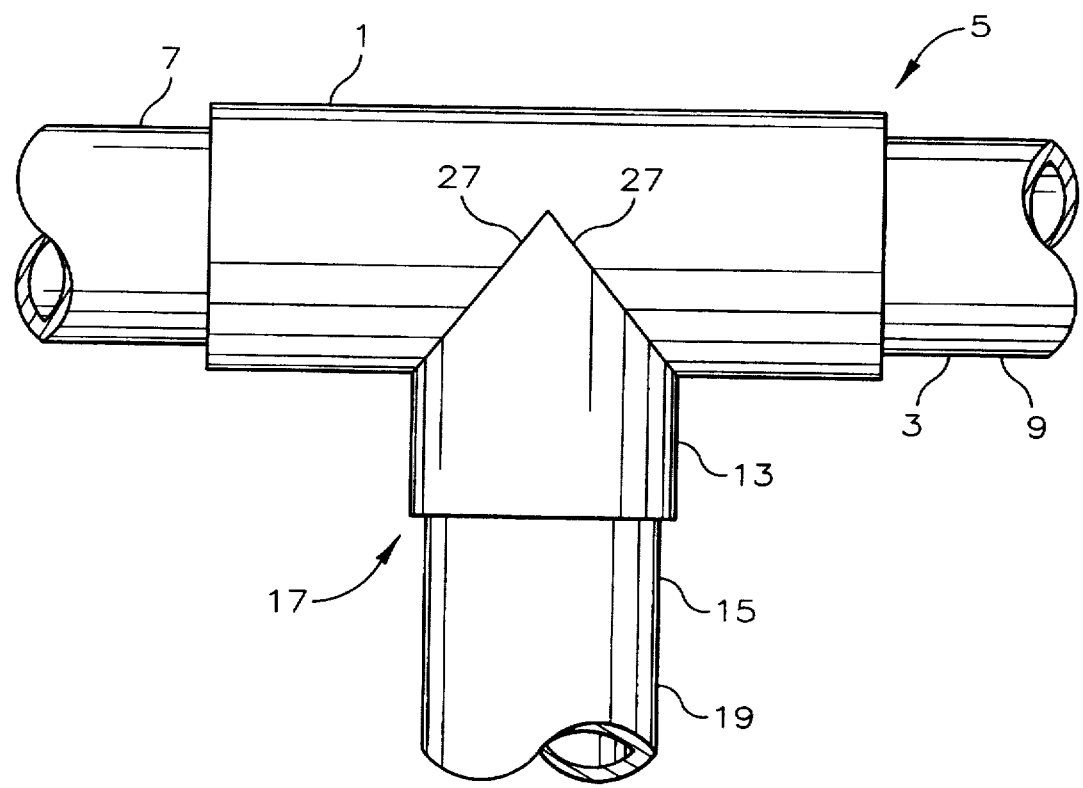
FIG. 3 is a pictorial representation of a resulting T-fitting produced from the cut dual pipe length of FIGS. 1 and 2.
Figure 4:
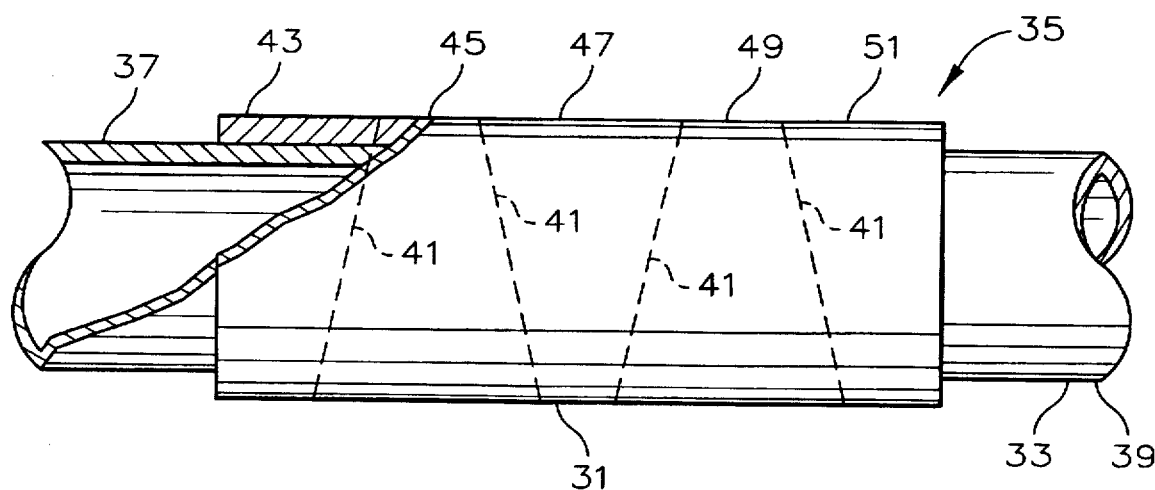
FIG. 4 is a pictorial representation of an interference fit between two pipe lengths with the dotted line illustrating a cut to be made in the resulting dual pipe length.
Figure 5:
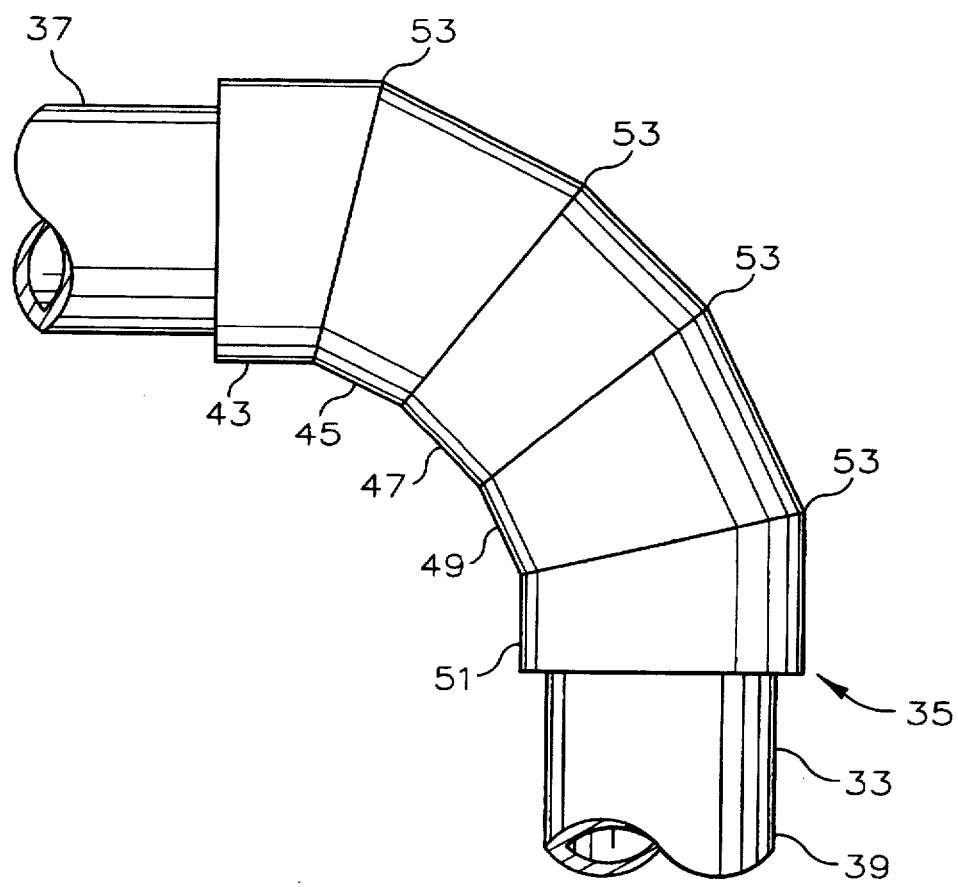
FIG. 5 is a pictorial representation of the resulting elbow fitting produced from the cut dual pipe length of FIG. 4.

Better understanding of the invention can be gained by reference to the Figures. FIGS. 1–3 represent a first embodiment of the invention and FIGS. 4 and 5 represent a second embodiment.

Referring now to the embodiment illustrated in FIGS. 1–3, the formation of the plastic pipe T-fitting is shown. FIG. 1 shows an outer plastic pipe 1, or outer tubular member, which is mated to an inner pipe 3, or inner tubular member, in an interference fit such that outer pipe 1 surrounds inner pipe 3 so as to form dual pipe length 5. The inner pipe and outer pipe are positioned so that a first length 7 of inner pipe 3 and a second length 9 of inner pipe 3 extend out and from the portion of inner pipe 3 which is surrounded by inner pipe 1. First length 7 and second length 9 are of sufficient length to be connected to the pipeline-main by butt-fusion techniques. After the inner pipe and outer pipe have been mated in an interference fit, an aperture is cut in the dual pipe length as illustrated by dotted lines 11 and 12.

In FIG. 2, there is illustrated an interference fit between an outer pipe 13 and inner pipe 15 to create a dual pipe length 17. Dual pipe length 17 is similar to dual pipe length 5 except that dual pipe length 17 has only a first length 19 of pipe extending out from the portion of inner pipe 15 surrounded by outer pipe 13. Both outer pipe 13 and inner pipe 15 have an end located at terminus 21. After the dual pipe length 17 is formed it is cut as illustrated by dotted line 23 and 25 in order that terminus 21 is formed into a shape which is matable with the periphery of the aperture formed by cutting dual pipe length 5 along dotted lines 11 and 12.

Referring now to FIG. 3, a tee fitting produced by mating the cut terminus 21 of dual pipe length 17 with the periphery of the aperture in dual pipe length 5 can be seen. Dual pipe length 17 and dual pipe length 5 are butt-fused during mating along seam 27 to form fluid-tight joints.

Referring now to FIGS. 4 and 5, a second embodiment of the invention can be seen. FIGS. 4 and 5 illustrate the formation of an elbow fitting by the process of the present invention. FIG. 4 illustrates an outer pipe 31 which has been interference fitted with an inner pipe 33 to form a dual pipe length 35. Dual pipe length 35 has a first length 37 and a second length 39 extending out from the area where the outer pipe 31 surrounds inner pipe 33. Dual pipe length 35 is cut in accordance with dotted line 41 to create pipe pieces 43, 45, 47, 49 and 51. The pieces 43–51 are then rearranged by rotating pieces 45 and 49 180° and butt-fused together to create the elbow fitting illustrated in FIG. 5. The pieces are butt-fused together to create fluid-tight joints 53.

Optionally, cuts 41 can be only through outer pipe 31 in which case, after cuts 41 have been made, inner pipe 33 is bent or deformed into the desired elbow, or L-shape. After inner pipe 33 has been bent into the desired shape, the pieces of outer pipe 45 and 49 are then rotated 180° into the appropriate configuration and butt-welded together in order to form seam 53.

The resulting fittings from the techniques described above have an inner bore diameter which is equal to that of the pipeline-main and ends of the same size and SDR to match the pipeline-main for purposes of connecting the fitting to the pipeline-main by butt-fusing of matching ends.

Many modifications and variations of the present invention are possible in light of the above teachings. It is, therefore, to be understood that within the scope of the appended claims, the invention may be practiced otherwise than specifically described.

That which is claimed:

1. A reinforced plastic pipe fitting comprising a plurality of angled cut tubular pieces each said piece having an angled cut inner tubular member and an angled cut outer tubular member wherein said outer tubular member surrounds said inner tubular member in an interference fit and wherein said angled cut tubular pieces are joined by butt-fusion such that said inner tubular members are butt-fused together and said outer tubular members are butt-fused together such that the interiors of said angled cut tubular pieces are in fluid flow communication and said plastic pipe fitting has a curved shape.

2. A plastic pipe tee comprising a first inner tubular member, a second inner tubular member, a first outer tubular member and a second outer tubular member wherein said first outer tubular member surrounds said first inner tubular member in an interference fit to form a first dual tubular member, said second outer tubular member surrounds said second inner tubular member in an interference fit to form a second dual tubular member and said first dual tubular member is joined by butt-fusion at right angles with said second dual tubular member such that said first inner tubular member is butt-fused to said second inner tubular member and said first outer tubular member is butt-fused to said second outer tubular member and such that a fluid tight seal is formed so that the interiors of said first dual tubular member and said second dual tubular member are in fluid flow communication.

3. A process for manufacturing reinforced plastic pipe fittings comprising:
    (a) placing an outer tubular member around an inner tubular member to create an interference fit;
    (b) selectively cutting at least said outer tubular member by at least one angled cut to produce a plurality of cut pieces;
    (c) rotating said plurality of cut pieces; and
    (d) butt-fusing said cut pieces together to form the desired fitting shape.

4. A process according to claim 3 further comprising after step (b) bending said inner tubular member into the desired fitting shape before butt-fusing said cut pieces in step (d).

5. A process according to claim 3 further comprising in step (b) selectively cutting said inner tubular member by at least one angled cut and butt-fusing said cut pieces together to form the desired fitting shape.

6. A process for producing a reinforced pipe tee comprising:
    (a) placing a first outer tubular member around a first inner tubular member to create an interference fit and to form a first dual tubular member having two ends;
    (b) placing a second outer tubular member around a second inner tubular member to create and interference fit and to form a second dual tubular member having two ends;
    (c) cutting said first dual tubular member to produce an aperture formed by a periphery in said first dual tubular member at a location between said two ends;
    (d) cutting said second dual tubular member at one of said two ends to produce a cut end having a surface which mates with the periphery of said aperture;
    (e) mating said cut end with said periphery such that the interior of said first dual tubular member is in fluid flow communication with the interior of said second dual tubular member; and
    (f) butt-fusing said cut end to said periphery.

* * * * *